United States Patent [19]

Copenhafer et al.

[11] Patent Number: 4,654,204
[45] Date of Patent: Mar. 31, 1987

[54] PRODUCTION OF SODIUM BICARBONATE BY REVERSION OF SODA-TYPE FEED SALT

[75] Inventors: William C. Copenhafer, Yardley, Pa.; Henry A. Pfeffer, III, Mercerville; Francis Rauh, Plainsboro, both of N.J.

[73] Assignee: Intermountain Research & Development Corporation, Green River, Wyo.

[21] Appl. No.: 755,406

[22] Filed: Jul. 16, 1985

Related U.S. Application Data

[63] Continuation-in-part of Ser. No. 524,486, Aug. 18, 1983, abandoned.

[51] Int. Cl.⁴ ............................................. C01D 7/40
[52] U.S. Cl. ............................... 423/422; 423/206 T; 423/186; 423/189
[58] Field of Search ........... 423/186, 189, 190, 206 T, 423/422, 423, 424, 429; 23/298, 302 T

[56] References Cited

U.S. PATENT DOCUMENTS

| | | | |
|---|---|---|---|
| 1,650,244 | 11/1927 | Sundstrom et al. | 423/421 |
| 2,704,239 | 3/1955 | Pike | 423/190 |
| 2,954,282 | 9/1960 | Bauer et al. | 23/306 |
| 3,113,834 | 12/1963 | Beecher et al. | 423/426 |
| 3,119,655 | 1/1964 | Frint et al. | 423/206 T |
| 3,184,287 | 5/1965 | Gancy | 423/427 |
| 3,314,748 | 4/1967 | Howard et al. | 423/426 |
| 3,361,540 | 1/1982 | Peuerly et al. | 423/206 T |
| 3,425,795 | 2/1969 | Howard et al. | 423/201 |
| 3,451,767 | 6/1969 | Saeman et al. | 423/203 |
| 3,751,560 | 8/1973 | Neumann | 423/189 |
| 3,780,160 | 12/1973 | Waggener et al. | 423/186 |
| 3,852,427 | 12/1974 | Hoffman et al. | 423/422 |

FOREIGN PATENT DOCUMENTS 5981 12/1979 European Pat. Off. ............. 423/422

Primary Examiner—Gary P. Straub
Attorney, Agent, or Firm—Christopher Egolf

[57] ABSTRACT

Sodium bicarbonate is produced by introducing solid sodium carbonate, sodium sesquicarbonate, and/or Wegscheider's salt into a reversion slurry, saturated with respect to bicarbonate and containing at least 10 wt. % solids, to effect rapid and complete conversion of the feed solids to crystalline sodium bicarbonate which is recovered from the slurry. Carbon dioxide is introduced into the reversion liquor to maintain its composition at a relatively constant value, preferably in a region of the $Na_2CO_3$—$NaHCO_3$—$H_2O$ phase diagram that minimizes the equilibrium partial pressure of $CO_2$ vapor above such liquor.

28 Claims, 2 Drawing Figures

PRODUCTION OF SODIUM BICARBONATE BY REVERSION OF SODA-TYPE FEED SALT

CROSS REFERENCE TO RELATED APPLICATION

This application is a continuation-in-part of application Ser. No. 524,486 filed Aug. 18, 1983, now abandoned.

BACKGROUND OF THE INVENTION

1. Field of the Invention

This invention relates to the preparation of sodium bicarbonate from sodium carbonate, sodium sesquicarbonate, and/or Wegscheider's salt, by effecting a reversion of the solid feed, in an aqueous medium, to crystalline sodium bicarbonate.

2. Description of the Prior Art

Sodium bicarbonate ($NaHCO_3$) is conventionally prepared by carbonation of aqueous sodium carbonate ($Na_2CO_3$); see R.N. Shreve et al, *Chemical Process Industries*, McGraw-Hill Book Co., 4th ed., 1977, p. 213.

Commercial bicarbonate processes first dissolve soda ash in an aqueous liquor and then introduce the saturated sodium carbonate solution into a carbonating tower or vessel, where it is intimately contacted with carbon dioxide gas and simultaneously cooled.

The crystallized sodium bicarbonate is withdrawn from the carbonating tower as an aqueous slurry, filtered, and dried. The aqueous liquor that remains after filtration of the solid sodium bicarbonate is used to dissolve more soda ash to continue the cyclic carbonation process.

This carbonation process, as well as other prior art carbonation procedures, suffers from several operating drawbacks: scale-formation on equipment surfaces; parallel equipment lines required to allow for periodic clean-outs; significant energy and corrosion costs due to hot operating temperatures; low product slurry density per pass due to limited sodium carbonate solubility.

Other carbonation processes for the production of sodium carbonate have also been disclosed in the prior art; in these an alkali other than aqueous sodium carbonate solution is treated with carbon dioxide.

European Patent Application Publication No. 5,981 (assigned to Stauffer Chemical Co.) describes the carbonation of a saturated solution of sodium carbonate and sodium bicarbonate or, alternatively, a slurry of sodium bicarbonate in such saturated solution, or a slurry of sodium bicarbonate and sodium sesquicarbonate in such saturated solution. A satisfactory crystalline sodium bicarbonate product is ensured by the presence of specific amounts of $Ca^{++}$ ion in solution during the carbonation.

U.S. Pat. No. 3,780,160, issued to Waggener et al on Dec. 18, 1973, describes the multistep manufacture of sodium bicarbonate from trona (crude sodium sesquicarbonate). Trona ore is dissolved in aqueous liquor, and sodium sesquicarbonate is crystallized by vacuum cooling of the aqueous sodium bicarbonate-sodium carbonate solution. The crystalline sodium sesquicarbonate is recovered, and redissolved in a second aqueous liquor. This second aqueous sodium bicarbonate-sodium carbonate solution is then carbonated to produce crystalline sodium bicarbonate, which is recovered and dried.

U.S. Pat. No. 2,704,239, issued to Pike on Mar. 15, 1955, describes the production of a sodium bicarbonate intermediate from trona ore and next calcining the crystalline sodium bicarbonate to yield a light density soda ash. The bicarbonate intermediate is obtained by first dissolving trona ore in an aqueous, hot liquor containing sodium bicarbonate and sodium carbonate, treating such solution with carbon dioxide to increase its bicarbonate content and then cooling or concentrating such solution to crystallize sodium bicarbonate. The crystalline sodium bicarbonate may be recovered and dried or, alternatively, calcined to form a light soda ash.

The method of this invention yields a sodium bicarbonate product with good crystal habit and sizing, without resorting to the conventional direct carbonation, cooling crystallization processes of the prior art.

SUMMARY OF THE INVENTION

In accordance with the present invention, sodium bicarbonate is produced in a continuous method which involves introducing granular solid sodium sesquicarbonate or sodium carbonate or Wegscheider's salt, as a solid feed or as a concentrated aqueous slurry feed containing greater than 5 wt % solids, into an aqueous reversion slurry saturated with respect to sodium bicarbonate and containing at least about 10 wt. % solids, to effect rapid and direct reversion of the crystalline feed salt to crystalline sodium bicarbonate, without resorting to cooling crystallization; withdrawing a portion of the aqueous reversion slurry and separating crystalline sodium bicarbonate from the aqueous reversion liquor, the bicarbonate being substantially free of solid feed salt; recycling aqueous reversion liquor, that remains after recovery of the bicarbonate product, to the aqueous reversion slurry; adjusting the bicarbonate content of the reversion liquor, via introduction of carbon dioxide to convert soluble carbonate to bicarbonate, to maintain a relatively constant composition in the aqueous liquor portion of the reversion slurry; and, further, maintaining the temperature of the aqueous reversion slurry at a relatively constant value, that is the same as or higher than the temperature of the recycled reversion liquor being reintroduced to the slurry.

The aqueous liquor of the reversion slurry is desirably maintained at a relatively constant composition such that sodium bicarbonate is the stable solid phase and such that the equilibrium partial pressure of $CO_2$ vapor above the liquor is minimized. The reversion liquor composition is preferably selected so as to maintain the equilibrium partial pressure of $CO_2$ vapor below 100 mm Hg, and more preferably below 50 mm Hg.

The temperature of the reversion slurry is preferably maintained at 20°–120° C., more preferably 35°–85° C. The crystal slurry density of the reversion slurry is most preferably maintained at 15–40 wt. % solids. The reversion is desirably performed in a well-stirred vessel, preferably of a size that provides an average residence time of from 0.25–4 hours.

The reversion and carbonation adjustment may be carried out as a single operation or separately. In a preferred embodiment, the carbon dioxide is introduced into the recycled reversion liquor, prior to its return to the reversion slurry.

The method of this invention is especially suited for use with carbon dioxide gas mixtures, which preferably contain at least 10 vol. % $CO_2$ in the mixture.

DETAILED DESCRIPTION

Figure 1:
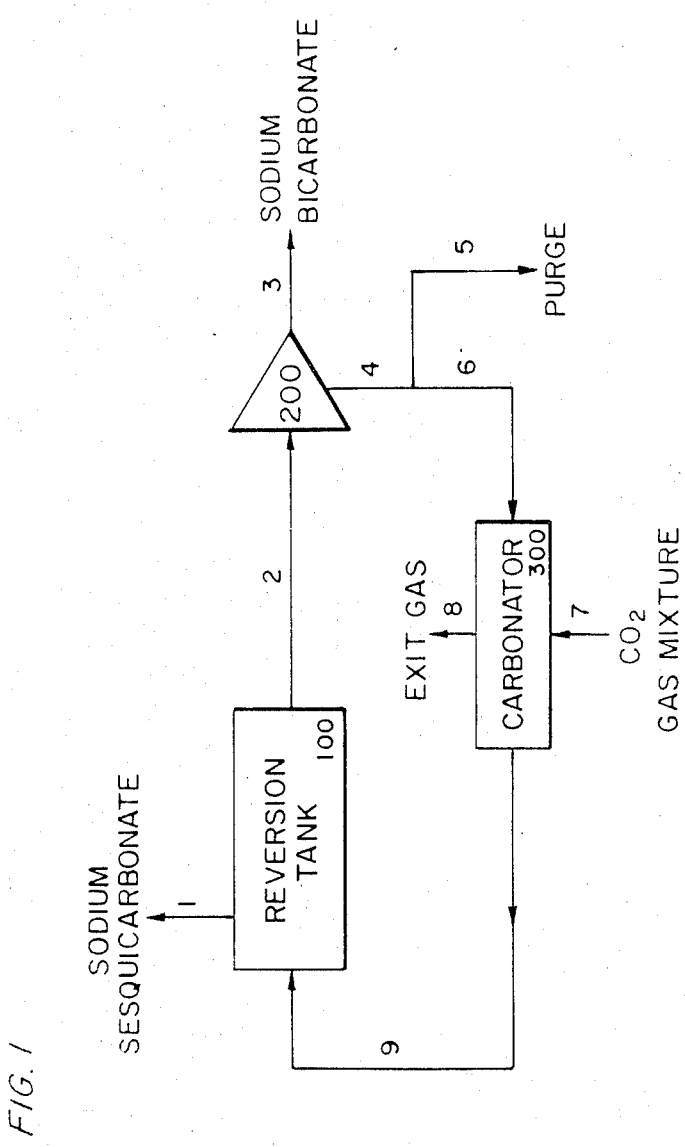
FIG. 1 is a schematic flow diagram of a preferred embodiment of the invention which utilizes sodium sesquicarbonate as a solid feed.

The solid feed employed in the production of sodium bicarbonate by this method is characterized in that it is a soda-type feed salt that contains sodium carbonate and may also contain sodium bicarbonate. It may be sodium carbonate, sodium sesquicarbonate ($Na_2CO_3.NaHCO_3.2H_2O$), or Wegscheider's salt ($Na_2CO_3.3NaHCO_3$), or combinations of these salts.

The solid sodium carbonate feed may be in the form of anhydrous sodium carbonate ($Na_2CO_3$), or a hydrated salt, e.g., sodium carbonate monohydrate ($Na_2CO_3.H_2O$) or sodium carbonate decahydrate ($Na_2CO_3.10H_2O$). For purposes of this disclosure, the terms sodium carbonate and soda ash refer to any of these forms, regardless of its source (natural ore, refined soda ash, Solvay soda ash).

Another suitable soda-type solid feed is trona ore, a crude sodium sesquicarbonate found in large subterranean deposits in southwest Wyoming; trona is one preferred source of sodium sesquicarbonate solid feed for this invention. Ore containing a significant amount of insoluble shale associate with the soluble trona is desirably beneficiated, e.g., by crushing and screening, to recover a crude sodium sesquicarbonate with a reduced level of insolubles. This presence of the usual soluble impurities in trona, such as nahcolite ($NaHCO_3$), sodium chloride ($NaCl$), sodium sulfate ($Na_2SO_4$), and the like, does not adversely affect the method of this invention.

Another preferred solid sesquicarbonate feed is the so-called "green cake" from a sesquicarbonate soda ash process; green cake is crystalline sodium sesquicarbonate that is crystallized during the production of sodium carbonate from trona via the "sesqui" process. Sesquicarbonate suitable for use in this invention may also be refined sodium sesquicarbonate, e.g., obtained by recrystallization of green cake.

Ore obtained from the lakebed deposits on Owens Lake in California is still another suitable source of crude sodium sesquicarbonate suitable for use as solid sodium sesquicarbonate feed.

Besides sodium carbonate and sodium sesquicarbonate, Wegscheider's salt may also be used as the solid feed for this method. Wegscheider's salt prepared from trona or other soda sources and the naturally-occurring mineral, wegscheiderite, are both suitable.

The solid feed, whether sodium carbonate, sodium sesquicarbonate, or Wegscheider's salt, should be granular. Particle sizing should be such that substantially all of the granular feed is less than 20 mesh sieve in size. Granular feed whose average particle size is less than 40 mesh sieve and larger than 200 mesh sieve is particularly preferred.

The smaller the average particle size of the granular feed, the more rapid is the reversion process and the shorter is the residence time required for the reversion slurry. While particle sizing smaller than 200 mesh is workable, its fineness may cause dusting and material handling difficulties. Extremely fine material also requires extensive grinding or milling which adds to the preparation cost for the feed.

In the method of this invention, the soda-type feed solids are converted, or recrystallized, into crystalline sodium bicarbonate via a technique called reversion. The reversion effects a transformation of the soda-type salt feed material into crystalline sodium bicarbonate, without the necessity of (i) forming a solution, (ii) carbonating the solution and (iii) crystallizing sodium bicarbonate, as is required in prior art bicarbonate production methods.

Consequently, an important advantage of this invention, with its reversion procedure for converting the solid feed to crystalline sodium bicarbonate, is that it does *not* require an energy-intensive crystallization step (cooling, evaporation, vacuum, etc.) and thus it consumes minimal energy. Equipment fouling, a common problem in prior art carbonation/crystallization bicarbonate methods, is also minimized in this invention since there is no conventional cooling crystallization of bicarbonate.

The aqueous reversion slurry employed in the reversion procedure is an aqueous liquor containing at least about 10 wt % solids. The solids are crystalline sodium bicarbonate. Slurry densities (percentage of solids based on the weight of the slurry) for the reversion slurry are preferably within the range of from 10–70 wt %, and more preferably from 15–40 wt %.

The aqueous liquor of the reversion slurry has a composition that is substantially saturated with respect to sodium bicarbonate, which is the stable solid phase. The method of this invention utilizes the discovery that when crystalline sodium carbonate, sodium sesquicarbonate, or Wegscheider's salt is added to the reversion slurry, such crystalline solids are rapidly and directly reverted, or recrystallized, to sodium bicarbonate. The sodium bicarbonate that results from this reversion process is relatively pure, containing very little, if any, traces of its precursor crystal.

The reversion process appears to involve a complete conversion by recrystallization of the solid feed material, which contains sodium carbonate, to a crystalline solid that is essentially all sodium bicarbonate. The reversion process is in no way simply a coating procedure, in which sodium bicarbonate is crystallized from the saturated reversion slurry onto the feed crystals. The feed crystals are unstable in the reversion slurry and thus are completely and directly recrystallized to sodium bicarbonate in the reversion medium. The crystal habit of the resultant sodium bicarbonate, moreover, is that typical of sodium bicarbonate and is not a pseudomorphic sodium bicarbonate based on the precursor feed salt crystals.

The aqueous reversion may be carried out in a single well-stirred vessel or tank, but multi-stage units provide the advantage of assuring complete conversion of the solid feed, with minimal feed solids being present in the recovered sodium bicarbonate. Because the reversion procedure occurs very rapidly, multi-stage operation is only a significant consideration where the particle sizing of the feed solids is relatively large, causing a slower reversion rate.

The reversion procedure is carried out on a continuous basis, which assures uniformity in the crystalline sodium bicarbonate product that results.

The aqueous reversion slurry should be maintained at a temperature within the range of 20° to 120° C. The slurry is preferably maintained at a temperature of 35° to 85° C. The lower operating temperatures, below about 50° C., are especially preferred.

No extraordinary cooling of the aqueous reversion slurry is required to effect the desired crystallization of sodium bicarbonate. The reversion crystallization is exothermic, and the only cooling required in the overall process of this invention is that required for removal of the crystallization exotherm. This is typically carried out by cooling of the recycle liquor loop.

It must be emphasized that the reversion crystallization is not accomplished via cooling of the aqueous reversion liquor/slurry. The reversion slurry does *not* have to be cooled, evaporated, or otherwise maintained at a temperature *below* that of the incoming, recycled reversion liquor (into which the solid feed may optionally be introduced).

The temperature within the aqueous reversion slurry is therefore maintained at about the temperature of the incoming, recycled aqueous reversion liquor or at a higher temperature. Because the reversion procedure is carried out on a continuous basis, the aqueous reversion slurry is also maintained at a relatively constant temperature.

The preferred lower operating temperatures allow the use of carbon or mild steel equipment instead of the corrosion-resistant alloys that are ordinarily required to resist the corrosiveness of sodium bicarbonate at higher temperatures. Low operating temperatures are also more energy efficient, since high solution temperatures need not be maintained. Another advantage of the low temperatures is that the equilibrium $CO_2$ partial pressures are also low, which permits more efficient ($CO_2$) absorption of dilute carbon dioxide gas mixtures during the carbonation adjustment.

The solid feed, crystalline sodium carbonate, sodium sesquicarbonate, or Wegscheider's salt, is ordinarily introduced directly into the reversion slurry, whereupon its conversion to sodium bicarbonate occurs. In an alternative procedure particularly suited for sodium sesquicarbonate and for sodium carbonate, the solid feed salt may first be slurried in aqueous solution, to form a concentrated aqueous slurry containing greater than 5 wt % solids and preferably at least 8 wt % solids, before its introduction to the reversion slurry. A preferred version of this latter procedure calls for the solid feed salt to be slurried in the recycled aqueous reversion liquor, after the recovery of the solid sodium bicarbonate and prior to the return of such liquor to the reversion slurry. This procedure allows for the efficient introduction of the solid feed salt to a reversion slurry vessel operated above atmospheric pressure. Wegscheider's salt is susceptible to decomposition in aqueous solution at low-to-moderate temperatures, so slurrying of this solid feed is best avoided.

The feed rate of solids introduced to the reversion slurry, and withdrawal rate of crystalline sodium bicarbonate, are preferably controlled such that the average residence time in the slurry ranges from about 15 minutes up to 4 hours. The relatively high slurry densities employed for the reversion slurry in this invention facilitate the use of long residence times in a moderately-sized reversion vessel. Longer residence times have the advantage of promoting growth of large crystals of good crystal habit.

Crystal habit modifiers, such as those described in U.S. Pat. Nos. 2,954,282 and 3,852,427, may be used as desired to improve crystal habit, but are not required.

Recovery of the crystalline sodium bicarbonate product from the reversion slurry is relatively straightforward. A portion of the reversion slurry is withdrawn, desirably as a continuous flowstream, and conventional solids-liquid separation techniques are used to separate the crystalline product from the aqueous liquor. Centrifugation, hydrocloning, and filtration procedures are satisfactory for this purpose. The solids separation is desirably performed at about atmospheric pressure. The separated sodium bicarbonate solids are preferably washed, e.g., to remove traces of entrained reversion liquor.

The separated sodium bicarbonate crystals are then dried, by conventional methods used for drying bicarbonate, to yield a free-flowing crystalline product. Air drying of the damp bicarbonate at a moderate temperature satisfactorily dries the recovered crystals without causing any significant decomposition of the bicarbonate. The free-flowing sodium bicarbonate product that results from the method of this invention is very pure, typically at least 99.8 wt % $NaHCO_3$.

In order to assure that the reversion liquor composition in the slurry remains relatively constant and to allow the reversion process to be carried out continuously, carbon dioxide is added as necessary to convert the soluble sodium carbonate to sodium bicarbonate. As noted previously, the reversion liquor composition must be such that sodium bicarbonate is the stable solid phase. Expressed differently, the aqueous liquor of the reversion slurry must have a composition that lies within the sodium bicarbonate portion of the $Na_2CO_3$—$NaHCO_3$—$H_2O$ phase diagram.

The carbonate dioxide addition is controlled to maintain the composition of the reversion liquor at a relatively constant value. The carbonation adjustment step thus ensures that soluble sodium carbonate does not accumulate in concentration in the reversion liquor.

The carbonation that is required in this invention differs significantly from prior art carbonation procedures: (i) reversion is the means used to effect bicarbonate crystallization in this method, and (ii) carbon dioxide requirements in this method are minimized when sodium sesquicarbonate or Wegscheider's salt are employed as the feed material, since a portion of the feed is already carbonated, i.e., sodium bicarbonate is present in the double salt feed.

The aqueous reversion liquor composition is desirably maintained at a composition that minimizes the equilibrium partial pressure of $CO_2$ above such liquor. This promotes efficient utilization of the $CO_2$ that is introduced into contact with the reversion liquor during the carbonation adjustment step. It will be recognized that the equilibrium $CO_2$ partial pressure depends on the temperature of the solution and thus will vary according to the particular operating temperature selected for the aqueous reversion slurry.

Figure 2:
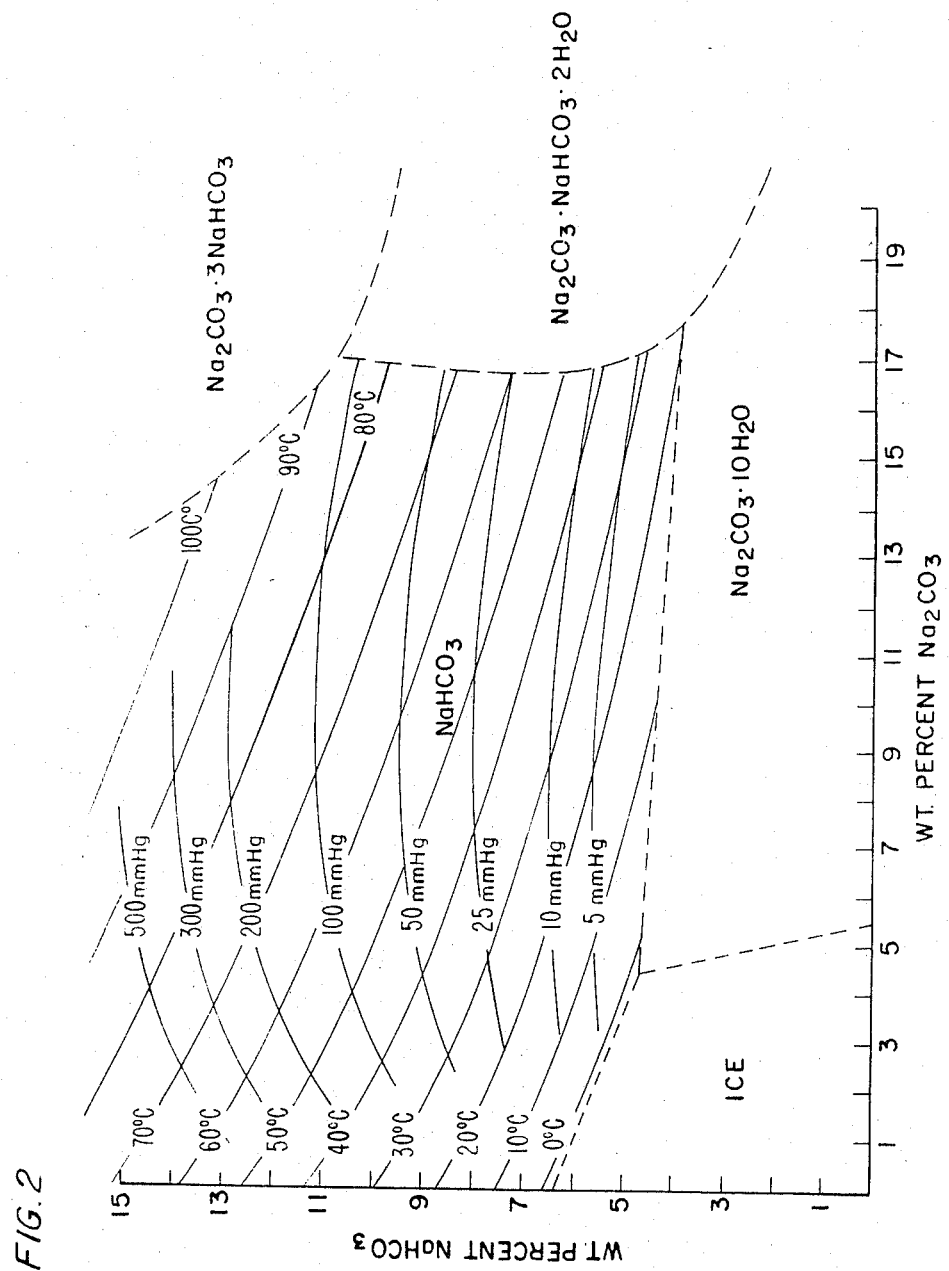
FIG. 2 is a phase diagram for the system $NaHCO_3$—$Na_2CO_3$—$H_2O$, showing the region in which sodium bicarbonate is the solid stable phase; equilibrium partial pressures of $CO_2$ vapor above such solutions are also shown by isobar lines.

The composition of the aqueous liquor is preferably such that is has an equilibrium partial pressure of $CO_2$ above such liquor below 100 mm Hg, more preferably below 50 mm Hg. Reference should be made to FIG. 2, which illustrates equilibrium partial pressures of $CO_2$ vapor or various compositions in which sodium bicarbonate is the stable solid phase.

Introduction of the carbon dioxide to the aqueous reversion liquor may be carried out in any of several ways. Such carbonation is desirably performed continuously but can also be done intermittently. The $CO_2$ is desirably introduced in gaseous form.

The carbon dioxide adjustment can be performed concurrently with the reversion, the two being carried out in a single vessel. Carbonation in this situation may be effected by introducing the $CO_2$ to a side stream of aqueous reversion liquor diverted for this purpose.

The carbon dioxide may alternatively be introduced in a carbonation step that is separate from the reversion procedure. A preferred procedure involves introducing the carbon dioxide to the aqueous liquor, from which the solid sodium bicarbonate product has been removed, prior to the reintroduction of such recycled liquor to the reversion slurry. Alternatively, the carbon dioxide adjustment may be made prior to recovery of the crystalline sodium bicarbonate from the withdrawn reversion slurry flowstream.

The $CO_2$-treated liquor flowstream in either of these alternatives is then recycled to the aqueous reversion slurry to continue the method of the invention and thereby maintain a relatively constant composition in the aqueous liquor of the reversion slurry.

The carbon dioxide may be introduced as a pure gas, containing essentially 100% $CO_2$. The method of this invention, however, is particularly well suited for use with gaseous mixtures that contain dilute $CO_2$ concentrations. Such mixtures are often deemed waste gas streams because of their low $CO_2$ content and are otherwise simply vented to the atmosphere. Gaseous $CO_2$ mixtures typically contain water, oxygen and/or nitrogen as the diluent gases, but other gases may also be present provided they are relatively inert with respect to the reversion. By way of example, sulfur dioxide in appreciable concentrations is undesirable as a diluent gas since its absorption into the reversion liquor results in the formation of sodium sulfite and possibly sodium sulfate.

Gas mixtures that contain at least 10 vol. % $CO_2$ are suitable for use in this invention, with gas mixtures having at least 40 vol. % $CO_2$ being preferred.

Because the reversion liquor is desirably maintained at a composition that minimizes the equilibrium partial pressure of $CO_2$ above such liquor, the modest concentrations (partial pressure) of $CO_2$ in the dilute gas mixtures employed for this invention are nevertheless sufficient to assure efficient absorption of the $CO_2$ into the liquor.

Total operating pressure during the reversion and carbonation adjustment procedures is desirably maintained at or slightly above one atmosphere pressure, so as to minimize the complexity of the equipment required. Total pressure may range, however, from about atmospheric up to five atmospheres, as desired. Pressure in the reversion vessel, if carbonation is separate from reversion, is desirably maintained at about atmospheric pressure, even when superatmospheric pressures are utilized during the carbonation adjustment.

Introduction of the carbon dioxide may be used, as desired, to help control the heat balance of the overall process. Removal of exothermic reaction heat from the system may be obtained by introducing the carbon dioxide at a temperature below the operating temperature of the aqueous reversion slurry, to provide some of the necessary cooling.

One of the advantages of the reversion procedures, besides the rapid and direct conversion of the solid feed to sodium bicarbonate, is that any impurities associated with the solid feed remain behind in the aqueous reversion liquor. The reversion thus effects a purification of the solid feed, as well as its conversion to sodium bicarbonate. In a preferred procedure, a portion of the recycled aqueous reversion liquor is purged, to prevent the accumulation of impurities in the aqueous reversion medium and to maintain the water balance of the reversion system.

EXAMPLES

Example 1

Sodium bicarbonate is prepared in this Example from crystalline sodium sesquicarbonate feed, at a rate of 1000 lb $NaHCO_3$/hr, by the following continuous procedure. The description of this Example utilizes the schematic flow diagram shown in FIG. 1, with reference numerals being those used in the drawing.

Solid sodium sesquicarbonate 1 is continuously introduced at a rate of 922 lb/hr to a reversion slurry in an agitated reversion tank 100. The reversion slurry, a total of about 10,000 lb. being contained in the tank 100, contains about 20 wt % crystalline sodium bicarbonate and is maintained at a temperature to 50° C.

Reversion of the introduced solid sesquicarbonate in the slurry is very rapid, so that the solids in the reversion slurry are essentially all sodium bicarbonate. Slurry 2 is continuously withdrawn from the tank at a rate of 5000 lb/hr, which provides a two-hour residence time in the reversion vessel. The reversion recrystallization of sesquicarbonate to sodium bicarbonate is only slightly exothermic, and no special heating/cooling provisions are required for maintaining the desired 50° C. operating temperature.

The withdrawn slurry 2 is hydrocloned and centrifuged, shown as block 200 in the drawing, to recover crystalline sodium bicarbonate as a damp cake 3 produced at a rate of 1070 lb/hr (1000 lb/hr dry basis).

To ensure that the reversion liquor composition in the reversion tank 100 remains relatively constant during the continuous operation of this method, the reversion liquor 4 that remains after the separation step is treated further before being reintroduced to the reversion slurry. First, a portion 5 of the reversion liquor, about 26 lb/hr, is purged and discarded to maintain the proper water balance in the system. Reversion of sodium sesquicarbonate to sodium bicarbonate, it should be noted, produces one mole of water for each mole of sodium sesquicarbonate introduced as feed.

Before being recycled to the reversion tank, the remaining reversion liquor 6 is treated with carbon dioxide, shown as block 300 in the drawing, to ensure that the proper, constant carbonate-bicarbonate composition is maintained in the reversion slurry tank liquor: 14.0 wt % $Na_2CO_3$ and 7.0 wt % $NaHCO_3$.

A carbon dioxide gas mixture 7, containing 66 vol. % $CO_2$ and 34 vol. % air, is contacted with the recycled reversion liquor 6 at a rate of 274 lb/hr. The gas mixture 7 is contacted with the liquor stream 6 at one atmosphere total operating pressure, with the operating steady-state partial pressure of $CO_2$ in the exiting gas mixture 8 being 176 mm Hg. Because the equilibrium partial pressure of $CO_2$ vapor above the reversion liquor stream is just 15 mm Hg at 50° C. (see FIG. 2), the $CO_2$ in the gas mixture 7 is readily absorbed into the recycled liquor flowstream, at a rate of 174 lb/hr, which is a $CO_2$ absorption efficiency of 85%.

After adjustment with $CO_2$, the $CO_2$-treated flowstream 9 contains 3.1 wt % $Na_2CO_3$ and 23.0 wt % $NaHCO_3$, a portion of the bicarbonate being present in solid form. This flowstream 9, at a temperature of about 50° C., is continuously recycled to the reversion tank 100, at a rate of 4078 lb/hr, to maintain the reversion slurry liquor composition at the desired constant value and thereby continue the bicarbonate process.

Similar yields are obtained when the process is carried out at a lower temperature, such as 35° C. The next example illustrates a low-temperature version of this method, with a different feed being used.

Example 2

Wegscheider's salt is used as the feed material in this Example to produce sodium bicarbonate continuously at a rate of 1000 lb/hr, using basically the same procedure as in Example 1 except for a lower operating temperature, 35° C. instead of 50° C.

Wegscheider's salt is continuously introduced in solid form at a rate of 869 lb/hr to a reversion slurry containing about 20 wt % crystalline sodium bicarbonate and maintained at 35° C. Reversion of the introduced Wegscheider's salt to sodium bicarbonate in the slurry is very rapid, and the solids in the slurry are essentially all sodium bicarbonate. Slurry is continuously withdrawn from the agitated tank of a rate of 5000 lb/hr. As in Example 1, no special provisions for heating/cooling are required to maintain the desired 35° C. operating temperature since the reversion recrystallization is only mildly exothermic.

The withdrawn slurry is centrifuged to yield a damp sodium bicarbonate cake, at a rate of 1070 lb/hr (1000 lb/hr dry basis).

The reversion liquor stream from the solids-separation step, before being recycled to the reversion slurry, is next treated with $CO_2$ to adjust its carbonate-bicarbonate content to ensure that the reversion liquor composition in the reversion slurry remains relativley constant during the continuous operation of this method. Unlike the first Example in which sodium sesquicarbonate was the solid feed, there is no need in this Example to purge a portion of recycled liquor to maintain the proper water balance. The conversion of Wegscheider's salt to sodium bicarbonate consumes one mole of water for each mole of salt, so make-up water is added to the system in this Example, at a rate of 98 lb $H_2O$/hr during the carbonation adjustment.

The composition of the reversion liquor in the reversion slurry is desirably maintained at 14 wt % $Na_2CO_3$ and 5.7 wt % $NaHCO_3$. To this end, the reversion liquor flowstream is contacted with a carbon dioxide gas mixture containing 66 vol. $CO_2$ and the balance air at a rate of 162 lb/hr to adjust its carbonate-bicarbonate content. The gas mixture is contacted with the reversion liquor stream at one atmosphere total operating pressure, with the operating steady-state partial pressure of the exiting $CO_2$ gas being 176 mm Hg. Since the equilibrium partial pressure of $CO_2$ vapor above the reversion liquor stream is only 8 mm Hg at 35° C. (see FIG. 2), the $CO_2$ in the gas mixture is readily absorbed into the recycled liquor flowstream at a rate of about 103 lb/hr, which is a $CO_2$ absorption efficiency of 85%.

After adjustment with $CO_2$, the $CO_2$-treated flowstream contains about 7.3 wt % $Na_2CO_3$ and 14.9 wt % $NaHCO_3$, a portion of the bicarbonate being present in solid form. This flowstream, at a temperature of about 35° C., is continuously recycled to the reversion slurry, at a rate of 4131 lb/hr to maintain the reversion slurry liquor composition at the desired constant value and to thereby continue the bicarbonate recovery process.

We claim:

1. A continuous method for the production of sodium bicarbonate, which comprises intoducing granular solid sodium sesquicarbonate or sodium carbonate or Wegscheider's salt, as a solid feed or as a concentrated aqueous slurry feed containing greater than 5 wt % solids, into an aqueous reversion slurry saturated with respect to sodium bicarbonate and containing at least about 10 wt. % sodium bicarbonate solids, to effect rapid and direct reversion of the crystalline feed salt to crystalline sodium bicarbonate, without resorting to cooling crystallization;

withdrawing a portion of the aqueous reversion slurry and separating crystalline sodium bicarbonate from the aqueous reversion liquor, the bicarbonate being substantially free of solid feed salt;

recycling aqueous reversion liquor, that remains after recovery of the bicarbonate product, to the aqueous reversion slurry;

adjusting the bicarbonate content of the reversion liquor, via introduction of carbon dioxide to convert soluble carbonate to bicarbonate, to maintain a relatively constant composition in the aqueous liquor portion of the reversion slurry; and, further, maintaining the temperature of the aqueous reversion slurry at a relatively constant value, that is the same as or higher than the temperature of the recycled reversion liquor being reintroduced to the slurry.

2. The method of claim 1 wherein the feed salt is sodium sesquicarbonate in the form of trona.

3. The method of claim 1 wherein the feed salt is sodium carbonate that is selected from sodium carbonate monohydrate, sodium carbonte decahydrate, and anhydrous sodium carbonate.

4. The method of claim 1 wherein the feed salt is substantially all less than 20 mesh sieve in size.

5. The method of claim 1 wherein the feed salt has an average particle size less than 40 mesh sieve and larger than 200 mesh sieve.

6. The method of claim 1 wherein the aqueous liquor of the reversion slurry is maintained at a composition such that sodium bicarbonate is the stable solid phase and such that the equilibrium partial pressure of $CO_2$ vapor above such liquor is minimized.

7. The method of claim 6 wherein the reversion liquor composition is selected so that the equilibrium partial pressure of $CO_2$ vapor is maintained below 100 mm Hg.

8. The method of claim 6 wherein the reversion liquor composition is selected so that the equilibrium partial pressure of $CO_2$ vapor is maintained below 50 mm Hg.

9. The method of claim 1 wherein the reversion slurry is maintained at a temperature of from 20° to 120° C.

10. The method of claim 1 wherein the reversion slurry is maintained at a temperature of from 35° to 85° C.

11. The method of claim 1 wherein the reversion is carried out in a well-stirred vessel.

12. The method of claim 1 wherein the reversion is carried out at a total operating pressure of from about 1 to 5 atmospheres.

13. The method of claim 1 wherein the reversion slurry is maintained at a crystal slurry density of up to 70 wt. % sodium bicarbonate solids.

14. The method of claim 13 wherein the reversion slurry is maintained at a crystal slurry density of 15 to 40 wt. % sodium bicarbonate solids.

15. The method of claim 1 wherein the average residence time in the reversion slurry ranges from about 0.25 to 4 hours.

16. The method of claim 1 wherein the reversion and carbonation adjustment are carried out in a single vessel.

17. The method of claim 1 wherein the reversion and carbonation adjustment are carried out separately.

18. The method of claim 17 wherein $CO_2$ is introduced into the withdrawn portion of the aqueous reversion slurry prior to separation of the sodium bicarbonate product from the reversion liquor.

19. The method of claim 17 wherein $CO_2$ is introduced into the recycled reversion liquor, after recovery of the sodium bicarbonate product and prior to the liquor's return to the reversion slurry.

20. The method of claim 1 wherein the carbon dioxide is essentially pure carbon dioxide.

21. The method of claim 1 wherein the $CO_2$ contains diluent gases, being a gaseous $CO_2$ mixture.

22. The method of claim 21 wherein the gaseous $CO_2$ mixture contains at least 10 vol. % $CO_2$.

23. The method of claim 21 wherein the gaseous $CO_2$ mixture contains at least 40 vol. % $CO_2$.

24. The method of claim 21 wherein the gaseous $CO_2$ mixture contains water, oxygen and nitrogen.

25. The method of claim 1 wherein the carbonation adjustment is carried out at a total operating pressure of from about 1 to 5 atmospheres.

26. The method of claim 1 wherein a portion of the recycled aqueous reversion liquor is purged, to prevent the accumulation of impurities in the reversion slurry.

27. The method of claim 1 wherein the salt feed is sodium sesquicarbonate or sodium carbonate and is added to the reversion slurry as an aqueous slurry feed containing at least 8% solids.

28. The method of claim 27 wherein the solid salt feed is introduced into recycled reversion liquor, prior to its return to the reversion slurry, to prepare the aqueous slurry feed.

* * * * *